United States Patent [19]
Mayer

[11] Patent Number: 5,383,549
[45] Date of Patent: Jan. 24, 1995

[54] CONVEYOR-BELT CYLINDER

[75] Inventor: Manfred Mayer, Friedrichsthal, Germany

[73] Assignee: Precismeca Gesellschaft für Fördertechnik mbH, Sulzbach/Saar, Germany

[21] Appl. No.: 253,988

[22] Filed: Jun. 3, 1994

[30] Foreign Application Priority Data

Aug. 20, 1993 [DE] Germany .......................... 4327988

[51] Int. Cl.⁶ ................................................ B65G 39/10
[52] U.S. Cl. ...................................... 198/842; 384/480
[58] Field of Search ............... 198/500, 501, 780, 842; 193/37; 384/480, 903

[56] References Cited

U.S. PATENT DOCUMENTS 2,757,988 8/1956 Lecourbe ........................... 193/37

FOREIGN PATENT DOCUMENTS 806837 6/1951 Germany .......................... 193/37
2165920 4/1986 United Kingdom ............. 193/37

*Primary Examiner*—Cheryl L. Gastineau
*Attorney, Agent, or Firm*—Max Fogiel

[57] ABSTRACT

A conveyor-belt cylinder has a jacket (1) mounted on a shaft (4) by way of a base (2) and a roller bearing (3) at each end. Each base and bearing is secured by an annular spring (15) and sealed with a labyrinth seal comprising an inner ring (7) and an outer ring (8). The spring is inserted in an annular groove (16) in the shaft. A terminating cap (12) engages the outside of an outward-facing annular flange (10) on the inner seal ring and of another outward-facing annular flange (11) on the outer seal ring. The seal rings constitute stitute a prefabricated assembly in conjunction with the terminating cap. The side of the inner seal ring facing the bearing has an annular recess that accommodates the spring.

2 Claims, 1 Drawing Sheet

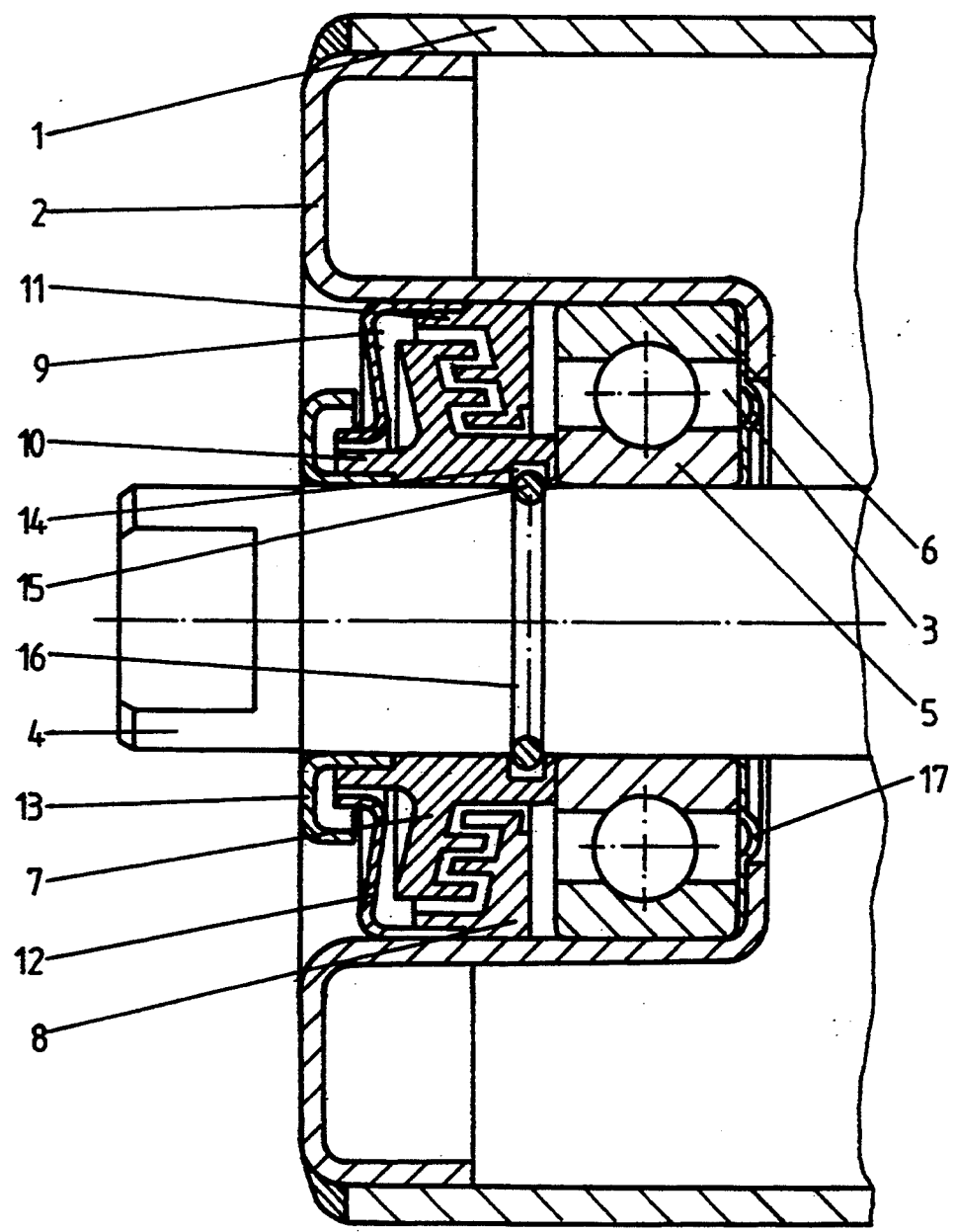

CONVEYOR-BELT CYLINDER

The present invention concerns a conveyor-belt cylinder with a jacket mounted on a shaft by way of a base and a roller bearing at each end, whereby each base and bearing is secured by an annular spring and sealed with a labyrinth seal comprising an inner ring and an outer ring.

The bearing employed in a conveyor-belt cylinder known from German OS 2 317 822 is secured by an annular spring. The spring has a breach in its wall and is inserted into an annular gap around the shaft of the cylinder. The bearing's inner-race ring rests against the spring on a shoulder. A labyrinth seal is positioned over the shaft. The bearing, the ring, and the seal always have to be mounted on the shaft in separate operations when such a cylinder is assembled, and the ring has to be positioned with a special tool.

The object of the present invention is an improved conveyor-belt cylinder of the aforesaid genus with a bearing system that is easier to mount on the shaft.

This object is attained in the generic conveyor-belt cylinder in accordance with the present invention whereby the spring is inserted into an annular groove in the shaft, whereby a terminating cap engages the outside of an outward-facing annular ring on the inner seal ring and of another outward-facing annular flange on the outer seal ring, and whereby the seal rings constitute a prefabricated assembly in conjunction with the terminating cap, characterized in that the side of the inner seal ring facing the bearing has an annular recess that accommodates the spring. An advantageous embodiment of the invention is a dust cap that covers both the outward-facing annular flange around the inner seal ring and the terminating cap is a component of the prefabricated assembly.

The spring is accordingly integrated into the seal in the cylinder in accordance with the present invention and the seal itself constitutes in conjunction with the terminating cap a prefabricated component. The whole structure can be thrust over the end of the shaft. One operation can accordingly be eliminated in mounting the sealing-ring system, and the spring can be mounted on the shaft without a tool. When the labyrinth seal is protected by a dust cap, the cap is also a component of the assembly.

The invention will now be specified with reference to the accompanying drawing, which is a longitudinal section through one end of the conveyor-belt cylinder.

The surface 1 of a cylinder, a supporting cylinder for example, is secured at each end to a Z-shaped base 2. Surface 1 is mounted on roller bearings 3 on a stationary shaft 4. Each bearing's inner ring 5 is force-fit onto shaft 4. Its outer ring 6 is force-fit into base 2 and rotates with surface 1. The side of each bearing that faces the cylinder is demarcated by a disk 17.

A labyrinth seal is mounted on the outward facing side of each bearing. The seal includes an inner ring 7 and an outer ring 8. These rings are made of plastic. Inner seal ring 7 is forced against shaft 4 and outer seal ring into surface 1. Rings 7 and 8 have inward-facing projections that mesh like cogs, creating a labyrinthine sealing compartment 9. Each ring 6 and 7 has an outward-facing annular flange 10 and 11. The flanges are overlapped radially by an annular metal terminating cap 12 with a Z-shaped cross-section. Compartment 9 can be further sealed off, especially when the cylinder is to be employed in a dusty environment, by an annular dust cap 13. Dust cap 13 has a U-shaped cross-section and engages both the outside of an outward-facing annular flange around terminating cap 12 and the inside of the flange 10 around inner seal ring 7.

The side of inner seal ring 7 that faces cylinder 3 has an annular depression 14. Depression 14 accommodates an annular spring 15. The wall of spring 15 is round in cross-section and is breached. The installed ring engages an annular groove 16 in shaft 4. Both cylinder 3 and the labyrinth ring are secured to shaft 4.

Inner seal ring 7, outer seal ring 8, terminating cap 12, and, if any, dust cap 13 constitute a prefabricated assembly. The overall assembly is thrust, with spring 15 inserted in inner seal ring 7, over shaft 4 in a single operation, securing both bearing 3 and the seal on the shaft. Spring 15 is simultaneously forced into the groove 16 around shaft 4 without the use of a tool.

I claim:

1. A conveyor-belt cylinder with two ends comprising: a shaft; a base mounted on said shaft at each said ends; a jacket secured to each said base; a roller bearing on said shaft at each end of said cylinder; an annular spring securing each said base and bearing; a labyrinth seal sealing each said base and bearing and comprising an inner seal ring and an outer seal ring; said spring being inserted in an annular groove in said shaft; a first outward-facing annular flange on said inner seal ring; a terminating cap engaging the outside of said first annular flange and of a second outward-facing annular flange on said outer seal ring; said inner seal ring and said outer seal ring comprising a prefabricated assembly in conjunction with said terminating cap; said inner seal ring having a side facing said bearing and having an annular recess accommodating said spring.

2. A conveyor-belt cylinder as defined in claim 1, including a dust cap covering both said first outward-facing annular flange around said inner seal ring and said terminating cap; said dust cap being a component of said prefabricated assembly.

* * * * *